United States Patent [19]
Watts

[11] 3,959,436
[45] May 25, 1976

[54] PROCESS FOR LEACHING SULFIDE MINERALS

[75] Inventor: John Conway Watts, Wilmington, Del.

[73] Assignee: E. I. Du Pont de Nemours and Company, Wilmington, Del.

[22] Filed: Sept. 26, 1974

[21] Appl. No.: 509,732

[52] U.S. Cl. .................... 423/27; 423/41; 423/98; 423/109; 423/150; 75/101 R; 75/104
[51] Int. Cl.² .................. C01G 3/00; C01G 9/00; C01G 21/00; C01G 53/00
[58] Field of Search ............. 423/27, 41, 98, 109, 423/150; 75/101 R, 104

[56] References Cited
UNITED STATES PATENTS

| | | |
|---|---|---|
| 617,911 | 1/1899 | Smith et al. .................. 423/41 |
| 1,021,768 | 4/1912 | Gahl .......................... 423/41 |
| 1,032,400 | 7/1912 | Gunther ....................... 423/41 |
| 1,041,407 | 10/1912 | Baxeres ....................... 75/104 |

OTHER PUBLICATIONS
Schumb et al., Hydrogen Peroxide, Reinhold Publishing Corp., New York, 1955, pp. 491, 594, 597, 598.

*Primary Examiner*—Oscar R. Vertiz
*Assistant Examiner*—Brian E. Hearn

[57] ABSTRACT

An improvement in the process of leaching metal sulfide minerals with an oxidative leaching solution is obtained by adding to the leaching solution over only a portion of the leaching cycle aqueous hydrogen peroxide in an amount ranging from about 2 to about 25 percent by weight of the quantity of hydrogen peroxide required to bring the metal value of the mineral into solution if hydrogen peroxide were used as the sole oxidizing agent.

17 Claims, 1 Drawing Figure

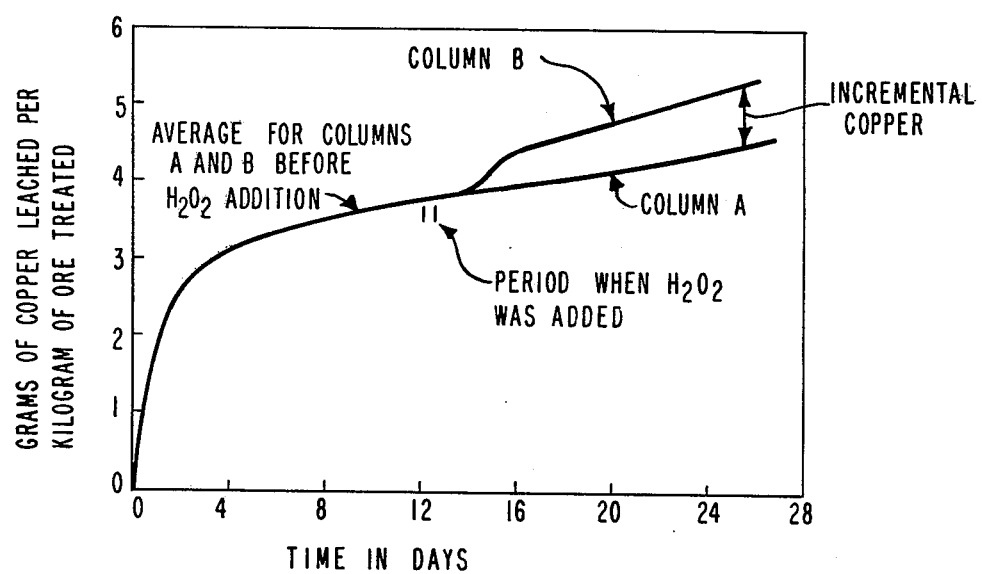

PROCESS FOR LEACHING SULFIDE MINERALS

BACKGROUND OF THE INVENTION

This invention relates to an improvement in a process for leaching of metal from metal sulfide minerals using an oxidative leaching solution, i.e., a leaching solution containing an oxidizing agent.

In the mining industry there has been a recent trend toward an increased use of chemical leaching techniques. Most leaching processes are slow and usually recovery of metal is incomplete. Generally, in leaching ores the leaching process is terminated when the rate of extraction of metal from the ore becomes too slow for further leaching to be economically feasible. For a variety of reasons leaching is often terminated at 50–85% of metal recovery. Some of the problems which cause this termination include coating of the ore particles with deposits of sulfur, precipitated ferric salts, or other materials which hinder leaching; clogging of access pores in the body of ore thereby slowing or stopping diffusion of leaching solution into the ore particles; and physical problems, such as channeling.

The leaching of metal sulfide minerals with ferric chloride and ferric sulfate solutions is well-known in the art. For example, U.S. Pat. No. 1,588,806 issued to Pike et al. on June 15, 1926 discloses leaching of metals from sulfide ores by using ferric sulfate or preferably ferric chloride.

In "Advanced Chemical Processing of Copper Sulfide Concentrates", a research proposal submitted to the National Science Foundation in November, 1972, the use of hydrogen peroxide to oxidize chalcopyrite at room temperature is disclosed. Stabilized forms of hydrogen peroxide were disclosed to be more effective in dissolving chalcopyrite then sulfuric acid and unstabilized hydrogen peroxide.

M. I. Timerbulatova et al., "The Use of Hydrogen Peroxide for the Separate Determination of Primary and Secondary Copper Sulfides" in Metody Izucheniya Veshchestvennogo Sostava i ikh Primenenie, 1965, pp. 113–117, disclose the dissolution of copper minerals with excess hydrogen peroxide. Complete dissolution of copper from finely ground chalcopyrite was obtained with a large excess of hydrogen peroxide, i.e., a solution containing 15% by weight hydrogen peroxide at a pH of 4.5.

In spite of these prior art methods, the efficient use of hydrogen peroxide to leach metal sulfide minerals remains to be demonstrated.

SUMMARY OF THE INVENTION

In the process for leaching of metals from metal sulfide minerals with an oxidative leaching solution, incremental metal beyond that normally extracted from the mineral can be obtained by the addition of aqueous hydrogen peroxide to the leaching solution.

Specifically, it has been discovered that incremental metal can be extracted from metal sulfide minerals in a process whereby the metal is leached from the mineral with an oxidative leaching solution by the improvement comprising the addition of aqueous hydrogen peroxide to the leaching solution. The aqueous hydrogen peroxide is added in a quantity varying from about 2 to about 25 percent by weight of the amount of hydrogen peroxide required to dissolve the metal when hydrogen peroxide is the sole oxidizing agent. The hydrogen peroxide is added continuously or in stages over a period of about 0.1 to 50 percent of the total leaching time. When hydrogen peroxide is added according to the process of the invention, the amount of incremental metal obtained, relative to the amount of hydrogen peroxide used is surprisingly high.

The addition of aqueous peroxide to leaching systems pursuant to the process of the invention aids the rate of metal extraction and extends the termination point for the leaching process so as to allow recovery of more metal than was normally feasible heretofore.

BRIEF DESCRIPTION OF THE DRAWING

The drawing is a graph illustrating incremental copper obtained when hydrogen peroxide is added to the leaching solution in accordance with the present invention.

DETAILED DESCRIPTION OF THE INVENTION

Metal solubilization is an important part of hydrometallurgy or chemical mining where metal is isolated from gangue materials. In the leaching or solubilization step in the hydrometallurgy of metal sulfide minerals the metal is transferred from the solid phase of the mineral to a liquid phase by an electrochemical reaction. Typical oxidizing agents used in this reaction are air, oxygen and ferric salts. The actions of the oxidizing agents can be enhanced by certain strains of bacteria.

The process of the invention can be used to leach metal from metal sulfide minerals in general. Typical metal sulfide minerals include chalcocite ($Cu_2S$), covellite (CuS), chalcopyrite ($CuFeS_2$), digenite ($Cu_9S_5$), bornite ($Cu_5FeS_4$), galena (PbS), pyrite ($FeS_2$), sphalerite (ZnS), greenockite (CdS), millerite (NiS), polydymite ($Ni_3S_4$), gersdorffite (NiAsS), parkerite ($Ni_3Bi_2S_2$), pyrrhotite ($Fe_{11}S_{12}$), arsenopyrite ($FeS_2.FeAs_2$) pendlandite ($(Fe,Ni)_9.S_8$), cinnabar (HgS), molybdenite ($MoS_2$), argentite ($Ag_2S$), stibnite ($Sb_2S_3$), realgar ($As_4S_4$), orpiment ($As_2S_3$), and linnaeite ($Co_3S_4$).

In a preferred embodiment of the invention the metal sulfide mineral which is leached is a sulfide of copper, nickel, cadmium, zinc, lead, silver or a mixture of the foregoing. In a more preferred embodiment the process of the invention is utilized to leach copper from copper sulfide minerals such as chalcocite, covellite and bornite with chalcocite and covellite being the most preferred minerals for the process of the invention. The mineral may be in the form of the raw ore or may be nearly pure as a result of concentration processes, such as froth flotation.

The process of the invention is not limited by the particle size of the ore. Generally, the particle size of the metal sulfide mineral will depend upon the particular leaching process employed, e.g., vat, heap, in-place, or agitation leaching; the specific mineral or ore involved; and whether the ore is flooded by the leaching solution or the solution is allowed to trickle through the ore. Generally, for agitation leaching a higher rate of oxidation and, thus, faster rate of leaching is obtained with minerals which have been crushed to smaller particle size, such as material passing through sieves having openings of about 8 to about 0.04 millimeter in diameter.

The leaching solution which is to be employed in the process of the invention is an oxidative solution. An oxidation leaching solution as used herein is defined as an aqueous solution containing an oxidizing agent other than $H_2O_2$. Included among suitable oxidative leaching solutions are acidic ferric sulfate, acidic ferric chloride, dilute nitric acid, chlorine water (HOCl,HCl), oxygen-saturated dilute sulfuric acid, oxygen-saturated dilute alkali, oxygen-saturated aqueous ammonia, and sodium hypochlorite solutions. In the preferred embodiment of the invention the leaching solution is acidic; acidic ferric sulfate and acidic ferric chloride leaching solutions are most preferred.

Dilute sulfuric acid leaching solutions will usually have a sulfuric acid concentration of about 0.005 to about 3.0 grams per liter of solution. These solutions have a pH value of about 4 to about 1.2. In solution mining high acid concentrations are not employed since constituents in the gangue will cause high acid consumption when the acid concentration is high, i.e., pH of the leaching solution is low. Acidic ferric chloride and acidic ferric sulfate solutions can have ferric ion concentrations of about 1 to about 20 grams per liter depending on such factors as the type of leaching and the ore being leached. Often, when acidic leaching solutions are employed, the pH of the solution is maintained during the leaching cycle by the addition of more acid thereto.

While most commercial grades of hydrogen peroxide can be used in the process of the invention, hydrogen peroxide grades especially formulated for contact with metal ions are preferred. Especially preferred for the process of the invention are the stabilized hydrogen peroxide solutions described in copending applications Ser. No. 393,056, filed Aug. 20, 1973 and Ser. No. 311,976, filed Dec. 4, 1972.

Hydrogen peroxide solutions having hydrogen peroxide concentrations varying from about 0.1 to 70% by weight can be used in the process of the invention. However, solutions having a hydrogen peroxide concentration of 1 to 10% by weight are preferred because better control over the addition of the hydrogen peroxide to the leaching solution is achieved thereby while keeping the volume of hydrogen peroxide solution such that it can be easily handled.

Leaching of ores in the process of the invention can be conducted in a variety of ways including in-place leaching, dump or heap leaching, vat leaching, or agitation leaching. These methods of leaching are well-known in the art. In-place leaching involves the breaking of the ore in its natural location and alternately circulating air and leach solution through the fractured rock. The pregnant solution drains through tunnels under the ore where it is collected for further processing. In heap leaching the ore is placed in heaps in areas provided with drainage ditches and basins. In vat leaching crushed ore or concentrated mineral is placed in vats which are sometimes arranged so as to provide successive leaches in a countercurrent manner so that the highest strength leach solution first contacts the lowest metal concentration in the mineral. Agitation leaching involves the use of mechanical stirring or air circulation to retain the ore in suspension during leaching. The leaching solution can be applied to the ore by spraying, by use of drill holes or by immersion depending upon the leaching technique employed.

In the process of the invention incremental metal is obtained during a leaching cycle by the addition of hydrogen peroxide in an amount of about 2 to about 25 percent by weight of the amount of hydrogen peroxide which would be required to oxidize and to bring into solution the metal content of the mineral if hydrogen peroxide were used as the sole oxidizing agent. As used herein "incremental metal" is defined as that amount of metal brought into solution from the mineral beyond the amount which is obtained using the leaching solution without the addition of hydrogen peroxide thereto.

When an acidic ferric sulfate solution is employed as the leaching solution for chalcocite minerals, the reactions involved can be represented as follows:

$$Cu_2S + O_2 + 4H^+ \rightarrow 2Cu^{2+} + S° + 2H_2O \qquad (1)$$

$$Cu_2S + 4Fe^{3+} \rightarrow 4Fe^{2+} + 2Cu^{2+} + S° \qquad (2)$$

$$Cu_2S + 2H_2O_2 + 4H^+ \rightarrow 2Cu^{2+} + S° + 4H_2O \qquad (3)$$

According to equation (3) dissolution of a kilogram of copper requires about 0.54 kilogram of hydrogen peroxide. However, some of the sulfur is converted to sulfate via the reaction $$S° + 3H_2O_2 \rightarrow SO_4^- + 2H_2 + 2H^+.$$

It is difficult to predict the exact extent that sulfate is produced and the extent to which other constituents in the ore will consume hydrogen peroxide. Moreover, since trivalent iron is frequently present in metal sulfide ores, the presence of this iron could reduce the amount of hydrogen peroxide actually needed. Therefore, the amount of hydrogen peroxide required to oxidize and to bring into solution the metal content of the mineral if hydrogen peroxide alone were used as an oxidizing agent will depend upon the particular ore or mineral involved. This amount of hydrogen peroxide is called herein "the hydrogen peroxide demand" of the mineral or ore. For each mineral to be leached, the hydrogen peroxide demand must be determined experimentally. For leaching a particular chalcocite ore the hydrogen peroxide demand was determined to be about one kilogram of hydrogen peroxide per kilogram of copper produced.

In the process of the invention hydrogen peroxide is added to the leaching solution as an additional oxidizing agent. Hence in leaching by the process of the invention, the leaching solution is employed in the same quantities as taught in the prior art. In a trickle leach the amount of leaching solution employed must be sufficient to wet the body of ore and flow through it so that the solution can be recycled. In other types of leaching systems greater quantities of solution are required and will depend upon the particular system and ore.

In the process of the invention hydrogen peroxide is added to the leaching solution as an aqueous solution having a hydrogen peroxide concentration as previously defined.

The addition of hydrogen peroxide is conducted over only a portion of the total leaching time. The percentage of total leach time over which hydrogen peroxide is added can vary from about 0.1 to about 50. In a preferred embodiment of the invention addition of hydrogen peroxide is performed over a time period of 0.2 to about 20% of the total leaching time. It is important that the hydrogen peroxide be added to the leaching solution either continuously or in stages over the time period specified herein. If the required amount of hydrogen peroxide is added all at once, deleterious effects or inefficient utilization may result. The process of the invention allows hydrogen peroxide to be utilized economically and efficiently in the leaching of metals from metal sulfide minerals. If hydrogen peroxide is added over a time period exceeding the abovedefined limits, hydrogen peroxide utilization will be less efficient.

The aqueous hydrogen peroxide can be added to the leaching solution in any manner suitable for the leaching system being utilized in accordance with the requirements of the invention. For instance, in vat leaching where the mineral is flooded with the leaching solution the hydrogen peroxide can be addeddropwise to the suspension of ore in leaching solution over the portion of the total leaching cycle as taught herein. In a heap leaching system wherein the leaching solution is allowed to trickle over the ore, the hydrogen peroxide can be combined with the leaching solution just prior to dropping the leaching solution onto the ore. Other ways of adding the hydrogen peroxide will be readily apparent to those skilled in the art.

Although the present process will usually be conducted at ambient temperature, the process is operable over a temperature range of about 0°C. to 100°C. and temperatures over 100°C. may be employed when leaching is conducted under pressure.

In the process of the invention hydrogen peroxide performance is measured by the ratio:

$$\frac{\text{weight of } H_2O_2 \text{ added}}{\text{weight of incremental copper produced.}}$$

In leaching chalcocite with aerated acidic ferric sulfate solution, when hydrogen peroxide is added to leaching solution in amounts of about 2 to about 25% by weight of the stoichiometrically required amount and during a time period equal to about 0.5 to about 20% of the total leaching time, hydrogen peroxide performance ratios of 0.5 to 1.8 are obtained. Ratios below 1.0 depict apparent synergism. When hydrogen peroxide is added to the leaching solution in the amounts prescribed herein but the addition is made over the entire time of leaching, hydrogen peroxide performance ratios greater than 1.8 are obtained.

The metal which is extracted from the mineral can be recovered from the leaching solution by techniques which are well-known in the art, such as precipitation, reduction with hydrogen, and electrowinning.

The process of the invention results in the obtaining of richer leaching effluents than those obtained in prior art processes and thus leads to a more efficient metal isolation step. Moreover, the use of hydrogen peroxide is ecologically clean.

The invention is further described by the following illustrative examples in which all percentages are by weight unless otherwise indicated.

EXAMPLE 1

A chalcocite-rich ore was coarsely ground and the fraction of ore passing through a screen having openings of 4.76 mm but retained by a screen having openings of 2.38 mm. was recovered. This ore fraction assayed 0.7% copper, i.e., 7 grams of copper per kilogram of ore, and contained small amounts of iron-containing minerals. Two closed-bottom columns, 4.5 × 37 cm., were each equipped with 2 lengths of glass tubing having an inner diameter of 4 mm. and extending from the top to the bottom of the columns. After the columns were nearly filled with the ore fraction, a solution of sulfuric acid containing 5 grams of ferric ions as ferric sulfate per liter of solution was added to each column so as to completely flood the ore, i.e., the ore was completely immersed in the solution. The sulfuric acid solution had a pH of 1.8. The columns, designated A and B were immersed in a constant temperature bath of 30°C. Air saturated with water at 30°C. was passed through one glass tube of each column at a rate of 50 cc. per minute, thereby maintaining the solution saturated with oxygen and providing mixing. After 12.8 days of leaching, a dilute hydrogen peroxide solution was added in five portions over five hours to column B whereas column A did not receive hydrogen peroxide and served as a control. The hydrogen peroxide solution contained 4% hydrogen peroxide by weight and was prepared by diluting a 50% solution of hydrogen peroxide stabilized against copper ion-catalyzed degradation with 0.5% of adipic and 0.5 % of succinic acids as described in copending application Ser. No. 311,976.

Leaching was allowed to proceed for a total of 27 days, during which time the pH of the solution was maintained at 1.8 by adding 50 % sulfuric acid as needed. All additions to the columns were made through one of the glass tubes under air pressure. Thus, reagents entered the columns from the bottom and diffused throughout the ore mass in the column with the aid of air stream agitation.

Periodically, the extent of copper solubilization was determined as follows:

1. A 0.10 milliliter sample of the leaching solution was taken and the copper concentration contained therein was determined in grams per liter by atomic absorption spectroscopy.

2. The volume (in liters) of the leaching solution was determined by adding the volume of free liquid and volume of retained liquid. The volume of free liquid was obtained by draining the leaching solution from the column through one of the glass tubes and measuring its volume. The volume of retained liquid was determined by ascertaining the milliliters of solution retained per gram of ore and multiplying this value by the weight of the ore in the column.

3. The number of grams of copper solubilized was calculated by multiplying the copper concentration by the total volume of leaching solution.

In this example and the following examples to provide a common basis of comparison, measurements of hydrogen peroxide added and copper solubilized were converted to reflect treatment of one kilogram of ore.

After 27 days of leaching, the resulting data were plotted to give the curve shown in the drawing. Based on one kilogram of ore, a total of 0.362 g. of hydrogen peroxide, which was 5.2% of the hydrogen peroxide demand, was added to column B. After day 26, column A gave 4.67 g. of copper whereas column B gave 5.32 g. of copper. Thus, 0.65 g. of incremental copper was produced by the addition of 0.362 g. of hydrogen peroxide (100% basis) over about 0.21 day which was 0.77% of the total leaching time. The performance ratio as defined herein above was 0.6.

EXAMPLE 2

This example was performed according to the procedure of Example 1 with the following exceptions:

1. A solution of dilute sulfuric acid and ferric sulfate was pumped from the bottom of the columns and returned to the top where the solution was added to the mineral ore dropwise at a flowrate of 2 ml. per minute to create a trickle leach.

2. A total of 0.774 g. (100% basis) of $H_2O_2$, which is 11.0% of the hydrogen peroxide demand, was added from day 12.7 to day 14.0.

3. The hydrogen peroxide solution contained 4% hydrogen peroxide on an absolute basis and was prepared by diluting a 35% hydrogen peroxide composition stabilized against decomposition catalyzed by heavy metal ions and surfaces of insoluble metal sulfides by the addition of 0.5% phenol and 0.5% of "Dequest" 2010, a product of Monsanto Company which contains from 58 to 62% of 1-hydroxy-ethylidene-1,1-diphosphonic acid, as described in copending application Ser. No. 393,056.

The incremental copper produced by the addition of 0.744 g. of hydrogen peroxide, amounting to 11.0% of the hydrogen peroxide demand, over 5.4% of the total leaching time was 0.50 g. which gave a hydrogen peroxide performance ratio of 1.5.

EXAMPLE 3

The following example illustrates the addition of a small quantity of hydrogen peroxide near the beginning of the leaching cycle.

The procedure followed in this example was the same as in Example 1 except that 0.248 g. (100% basis) of hydrogen peroxide, the solution of which had the composition of the aqueous hydrogen peroxide described in Example 2, was added from day 2.7 to day 3.0. By the addition of this amount of hydrogen peroxide (3.5% of the hydrogen peroxide demand) over 1.1% of the total leaching time 0.43 g. of incremental copper was produced. The hydrogen peroxide performance ratio was 0.6.

EXAMPLE 4

Chalcocite ore having the composition and description of that described in Example 1 was leached according to the procedures described therein with the following modifications:

1. The leaching solution was a dilute sulfuric acid solution containing no added ferric sulfate and having a pH of 1.0 which was maintained throughout the leaching cycle.
2. A total of 1.29 g. of hydrogen peroxide (100% basis) was added from day 2.1 to day 6.0.

For this 1.29 g. of hydrogen peroxide which amounted to 18.4% of the hydrogen peroxide demand and which was added over 13.4% of the total leaching time 2.17 g. of incremental copper were produced, thereby giving a hydrogen peroxide performance ratio of 0.6.

EXAMPLE 5

Chalcocite ore having the composition and properties of that described in Example 1 was leached according to the procedure described therein with the following modifications:

1. The leaching solution had and was maintained at pH 1.0.
2. A total of 0.62 g. of hydrogen peroxide (on 100% basis) was added from day 17.1 to day 21.2.

This addition of hydrogen peroxide which amounted to 8.8% of the hydrogen peroxide demand over 14.0% of the total leaching time resulted in 0.4 g. of incremental copper giving a hydrogen peroxide performance ratio of 1.6.

EXAMPLE 6

Chalcocite ore having the composition and properties of the ore described in Example 1 was leached according to the procedure outlined therein except that 0.91 g. of hydrogen peroxide (on 100% basis) was added to the leaching solution from day 2.7 to day 3.7. The amount of incremental copper obtained by this addition of 13% of the hydrogen peroxide demand over 3.7% of the leaching time was 0.85 g., which gave a hydrogen peroxide performance ratio of 1.1.

EXAMPLE 7

In this example chalcocite ore having the composition and properties of the ore described in Example 1 was leached pursuant to the procedures described therein with the exception that 0.818 g. of hydrogen peroxide (100% basis) was added to the leaching solution from day 17.7 to day 18.8. This addition of 11.7% of the hydrogen peroxide demand over a time period of 4.1% of the total leaching time yielded 0.68 g. of incremental copper which resulted in a hydrogen peroxide performance ratio of 1.2.

EXAMPLE 8

This example illustrates the results of leaching experiments in which hydrogen peroxide is added over time spans within and outside the scope of the invention.

A chalcocite rich ore was finely ground and a fraction passing through a screen having 0.50 mm. openings was recovered. This fraction assayed 0.9% copper. A four-necked round bottom flask equipped with a mechanical stirrer, thermometer, an inlet tube for introduction of air and an addition funnel was placed in a constant temperature bath set for 35°C. The flask was charged with 200 parts by weight of the above-described ore fraction and 200 parts by volume of a solution containing 5 grams of trivalent iron per liter, 5 grams of divalent iron per liter and sufficient sulfuric acid to give a pH of 1.

The ore was leached for eleven hours during which stirring at a constant rate and passage of a slow stream of air through the leaching solution were employed. After five hours of leaching, addition of hydrogen peroxide was commenced. Ten additions of 0.5 ml. of a 4.52% hydrogen peroxide solution (0.226 g. of $H_2O_2$ on a 100% basis, 12.5% of the hydrogen peroxide demand) were made over the next 4.5 hours, which was 41% of the leaching time. The amount of copper solubilized was determined at the end of 4, 8, 10.5 and 11 hours of leaching. The results are presented in Table I.

The above-described experiment was repeated except that the hydrogen peroxide addition was begun after 0.5 hour of leaching and was continued in stages over the next ten hours, which amounted to 91% of the leaching time. The same quantity of hydrogen peroxide was added in both experiments.

The experiment was repeated again except that no hydrogen peroxide was added. This experiment was used as a control. The amount of copper solubilized in each experiment is given in Table I.

TABLE I

| Time Period Over Which $H_2O_2$ Was Added | Cu in Solution per Kilogram of Ore Treated | | | |
|---|---|---|---|---|
| | 4 Hr. | 8 Hr. | 10.5 Hr. | 11 Hr. |
| 5.0 – 9.5 Hour (within scope) | 6.0 g | 7.0 g | 7.5 g | 7.5 g |
| 0.5 – 10.5 Hour (outside scope) | 5.1 | 5.6 | 6.3 | 6.3 |
| None added | 4.0 | 5.8 | 6.0 | 6.2 |

Thus after 11 hours, hydrogen peroxide when added according to the invention gave 1.3 g. more copper than the control, whereas hydrogen peroxide gave only 0.1 g. of extra copper when it was added over a time period outside the scope of the invention.

EXAMPLES 9 – 25

Other types of leaching solutions and leaching systems are employed in the process of the invention to extract metal from metal sulfide minerals as ores and as mineral concentrates. These experiments are presented in Table II where column leaching refers to a leaching system similar to that described in Example I. In each example listed in Table II incremental metal is obtained in comparison to control experiments wherein hydrogen peroxide is not added. The rate of metal dissolution varies widely, depending on the system under test and the refractoriness of the mineral.

TABLE II

| Example Number | Major Mineral Component | Temp. °C. | Type of Leaching System | pH | Oxidizing Agents Added (excl. $H_2O_2$) | $H_2O_2$ Added As % of $H_2O_2$ Demand | Time Period of Addition As % of Total Time of Extraction |
|---|---|---|---|---|---|---|---|
| 9 | chalcocite | 30 | agitation | 3–5 | air, $Fe^{+3}$ | 10.3 | 0.8 |
| 10 | chalcocite | 30 | vat | 2.4 | air, $Fe^{+3}$ | 21.7 | 18.1 |
| 11 | chalcocite | 28 | heap | 2.1 | air, $Fe^{+3}$ | 7.3 | 0.4 |
| 12 | covellite | 30 | column | 1.9 | air, $Fe^{+3}$ | 12.6 | 0.9 |
| 13 | bornite | 50 | agitation | 1.8 | air | 17.3 | 5.2 |
| 14 | covellite | 30 | agitation | 1.8 | oxygen | 7.4 | 0.5 |
| 15 | chalcopyrite | 60 | agitation | 0.8 | oxygen | 24.1 | 18.2 |
| 16 | Cu concentrate (chalcopyrite) | 30 | Agitation | 0.95 | oxygen, $FeCl_3$ | 24.1 | 18.2 |
| 17 | pyrite | 60 | column | 0.8 | air | 24.1 | 18.2 |
| 18 | chalcopyrite | 40 | agitation | 1.5 | $HNO_3$ | 10.4 | 15.1 |
| 19 | galena | 50 | agitation | 1.1 | $HNO_3$ | 8.2 | 15.1 |
| 20 | linnacite | 30 | agitation | 1.0 | $HNO_3$ | 8.2 | 15.1 |
| 21 | sphalerite | 28 | column | 2.0 | $HNO_3$ | 4.5 | 0.4 |
| 22 | galena | 30 | agitation | 2.0 | $Cl_2$(HOCl, HCl) | 10.4 | 15.1 |
| 23 | sphalerite | 60 | agitation | 2.0 | air | 10.4 | 15.1 |
| 24 | pentlandite | 30 | agitation | 2.0 | $HNO_3$ | 10.4 | 15.1 |
| 25 | argentite | 30 | agitation | 1.0 | HNO | 10.4 | 15.1 |

The invention claimed is:

1. In the process for leaching a metal sulfide mineral by contacting said mineral with an oxidative leaching solution to recover metal contained therein, the improvement comprising adding an aqueous solution of hydrogen peroxide to the oxidative leaching solution over a period of time of about 0.1 to about 50 percent of the total leaching time, said hydrogen peroxide being added in such an amount that on an absolute basis the quantity of hydrogen peroxide added varies from about 2 to about 25 percent by weight of the amount of hydrogen peroxide required to bring said metal into solution if hydrogen peroxide were the sole oxidizing agent.

2. In the process for recovery of metal values from a metal sulfide mineral by contacting the mineral with an aqueous oxidative solution and then drawing off the aqueous oxidative solution having metal values dissolved therein, the improvement comprising incorporating into the aqueous oxidative solution during from 0.1 to 50% of the total leaching time an amount of aqueous hydrogen peroxide equivalent to from about 2 to about 25% by weight of the theoretical amount of hydrogen peroxide required to dissolve all of the metal values contained in the mineral prior to such contacting.

3. The process of claim 2 wherein the metal sulfide mineral is selected from the group consisting of sulfides of copper, nickel, cadmium, zinc, lead, silver and mixtures thereof.

4. The process of claim 3 wherein the metal sulfide mineral is a copper sulfide mineral.

5. The process of claim 4 wherein the copper sulfide mineral is selected from the group consisting of chalcocite and covellite.

6. The process of claim 2 wherein the leaching solution is an acidic solution.

7. The process of claim 6 wherein the metal sulfide mineral is selected from the group consisting of sulfides of copper, nickel, cadmium, zinc, lead, silver and mixtures thereof.

8. The process of claim 7 wherein the metal sulfide mineral is a copper sulfide mineral.

9. The process of claim 6 wherein the leaching solution is a ferric sulfate-sulfuric acid solution.

10. The process of claim 9 wherein the metal sulfide mineral is selected from the group consisting of sulfides of copper, nickel, cadmium, zinc, lead, silver and mixtures thereof.

11. The process of claim 10 wherein the metal sulfide mineral is a copper sulfide mineral.

12. The process of claim 11 wherein the copper sulfide mineral is selected from the group consisting of chalcocite and covellite.

13. The process of claim 2 wherein the aqueous solution of hydrogen peroxide is added over a period of time of 0.2 to about 20% of the total leaching time.

14. The process of claim 13 wherein the leaching solution is acidic.

15. The process of claim 14 wherein the metal sulfide mineral is a copper sulfide mineral.

16. The process of claim 15 wherein the copper sulfide mineral is selected from the group consisting of chalcocite and covellite.

17. The process of claim 16 wherein the leaching solution is a ferric sulfate-sulfuric acid solution.

* * * * *